United States Patent [19]

Brabec

[11] Patent Number: 5,453,932
[45] Date of Patent: Sep. 26, 1995

[54] DEVICE AND METHOD FOR DETECTING AND ELIMINATION OF SPURIOUS ULTRANSONIC RANGING ECHOES

[75] Inventor: V. Joseph Brabec, Livermore, Calif.

[73] Assignee: Advanced Grade Technology, Inc., Livermore, Calif.

[21] Appl. No.: 180,886

[22] Filed: Jan. 12, 1994

[51] Int. Cl.$^6$ ............................ G01S 13/08; G01S 15/00; G01B 11/14
[52] U.S. Cl. .................... 364/424.07; 364/561; 364/562; 364/701; 73/627; 342/137; 356/5.01
[58] Field of Search ......................... 364/424.07, 167.01, 364/561, 569, 461, 701; 73/615, 597, 625, 620; 342/118, 135, 137; 356/5, 24; 367/95, 96, 99

[56] References Cited

U.S. PATENT DOCUMENTS

| | | | |
|---|---|---|---|
| 4,000,650 | 1/1977 | Snyder | 73/29 OR |
| 4,414,792 | 11/1983 | Bettencourt et al. | 56/10.2 |
| 4,630,226 | 12/1986 | Tanaka | 364/561 |
| 4,663,712 | 5/1987 | Kishida | 364/424 |
| 4,731,762 | 3/1988 | Hanks | 367/108 |
| 4,733,355 | 3/1988 | Davidson et al. | 364/561 |
| 4,831,565 | 5/1989 | Woodward | 364/571.01 |
| 4,914,593 | 4/1990 | Middleton et al. | 364/424.07 |
| 4,992,998 | 2/1991 | Woodward | 364/561 |
| 5,036,477 | 7/1991 | Forster et al. | 364/567 |
| 5,075,878 | 12/1991 | Ohtomo et al. | 364/569 |
| 5,079,751 | 1/1992 | Woodward | 367/96 |
| 5,102,220 | 4/1992 | Tiedeke | 356/5 |
| 5,107,449 | 4/1992 | Ikuta | 364/561 |

FOREIGN PATENT DOCUMENTS

0260113A2   3/1988   European Pat. Off. .

OTHER PUBLICATIONS

Cai et al., "Accurate Digital Time–Of–Flight Measurement Using Self–Interference", IEEE Dec. 1993—pp. 990–994.
Wang et al., "Analysis of Low–Order Autoregressive Models for Ultrasonic Grain Signal Characterization", IEEE 1991, pp. 116–124.
Maslin, "A Simple Ultrasonic Ranging System", presented at the 102nd Convention of the Audio Engineering Society on May 12, 1983.

*Primary Examiner*—Kevin J. Teska
*Assistant Examiner*—Tan Nguyen
*Attorney, Agent, or Firm*—Limbach & Limbach

[57] ABSTRACT

An ultrasonic ranging device and method for positioning a working implement relative to a datum is disclosed. The ultrasonic ranging device is coupled to the implement and is capable of transmitting an ultrasonic ranging pulse toward the datum and further capable of detecting the occurrence of an echo of the ranging pulse. The ultrasonic ranging device periodically makes a ranging measurement by transmitting an ultrasonic pulse toward the datum and then detecting the occurrence of any echo within a time interval, and repeats this ranging step at a predetermined repetition rate. The ultrasonic ranging device also detects any spurious echoes by detecting the occurrence of an echo within the time interval following no transmission of an ultrasonic pulse. If a spurious echo is detected, then the predetermined repetition rate is changed so that the spurious echo will not interfere with a ranging interval.

12 Claims, 3 Drawing Sheets

DEVICE AND METHOD FOR DETECTING AND ELIMINATION OF SPURIOUS ULTRANSONIC RANGING ECHOES

BACKGROUND OF THE INVENTION

1. Field of the Invention

This invention relates generally to a noncontacting range sensing and control device for controlling the position of an implement relative to a datum used primarily with road construction and earth moving vehicles. The invention relates more particularly to a device and method for avoiding positioning errors due to spurious ultrasonic ranging echoes.

2. Description of the Relevant Art

Motor graders, bulldozers, pavers, milling machines and other road construction and earth moving vehicles are often called upon to produce a graded or paved surface with reference to a pre-defined datum. In areas of new construction, for example, the datum may be defined as a string line supported by stakes placed adjacent to the path to be graded. In areas of reconstruction the datum may be an existing curb or pavement surface.

Various devices have been used on earth moving and paving vehicles to obtain the desired finished surfaces. The grading implement used by such a vehicle is typically positioned by hydraulic cylinders controlled by a positioning control device. A typical positioning control device includes a datum sensor mounted to the implement that senses the position of the implement relative to the datum, and a controller that responds to the sensed implement height and signals the hydraulic cylinders to reposition the implement accordingly.

One such datum sensor is an ultrasonic range sensing device, which operates by transmitting a burst of ultrasound, and then measuring the time required for the burst echo to return from the datum. Ranging bursts are sent out at regular intervals (40 times per second, for example), and each ranging interval results in a time or distance measurement. An example of an ultrasonic range sensing device in the prior art is shown in U.S. Pat. No. 4,733,355, which was issued to Agtek Development Company, Inc., a predecessor of the assignee of the present invention. The disclosure of U.S. Pat. No. 4,733,355 is hereby incorporated by reference.

Using the ultrasonic ranging method, spurious echoes from objects other than the datum may be produced from a ranging burst. Echoes return sequentially with an echo from the closest object returning first. As a rule, the first echo received, after waiting a specified settling time, is assumed to be an echo from the datum and is thus used to determine ranging distance. Echoes received after the first echo are assumed to be from objects other than the datum and are ignored as spurious.

This method works satisfactorily as long as all echoes from previous ranging bursts have diminished sufficiently in amplitude so as not to be detected during a subsequent ranging interval. When spurious echoes from a previous ranging interval have sufficient amplitude to be detected during a later ranging interval, measurement errors can occur. Errors of this type have been observed in conditions where ultrasound bursts bounce back and forth multiple times between the grading or paving vehicle and the surface on which it is grading. Such situations are referred to as "multipath errors."

SUMMARY OF THE INVENTION

The present invention overcomes the problems encountered in the prior art by employing a scheme in which spurious echoes are detected and removed from the ranging interval. In this way, any spurious echoes will not interfere with ranging determinations.

More particularly, the present invention is an ultrasonic ranging device and method for positioning a working implement relative to a datum. The ultrasonic ranging device of the present invention is coupled to the implement and is capable of transmitting an ultrasonic pulse toward the datum and further capable of detecting the occurrence of an echo of the transmitted ultrasonic pulse. The ultrasonic ranging device periodically makes a ranging measurement by transmitting an ultrasonic pulse toward the datum and then detecting the occurrence of any echo within a time interval, and repeats this ranging step at a predetermined repetition rate. The ultrasonic ranging device also detects any spurious echoes by detecting the occurrence of an echo within the time interval following no transmission of an ultrasonic pulse. If a spurious echo is detected, then the predetermined repetition rate is changed so that the spurious echo will not interfere with a ranging interval.

One feature of the present invention is to determine whether spurious echoes exist that would interfere with the identification of the echo from the datum and thereby hamper the determination of the actual distance between the grading implement and the datum. This is accomplished by periodically executing a "silent" interval during which no ranging pulse is generated but all echoes are detected, so that any detected echo is assumed to be spurious because it necessarily came from a prior ranging interval.

Another feature of the present invention is avoiding erroneous ranging determinations once spurious echoes are detected. If a spurious echo is detected during a silent interval, the present invention adjusts the period between ranging intervals until any spurious echoes that appear in subsequent ranging intervals are not detected because they are offset in time and no longer occur within the ranging interval. Adjusting the period between ranging intervals is the same as adjusting the repetition or cycle rate of the ranging intervals. By adjusting the period between or the cycle rate of the ranging intervals, the spurious echoes will not interfere with the proper reception of echoes from the datum.

It is an advantage of the present invention that by providing a varying repetition rate, the ultrasonic ranging device will be able to work accurately in numerous different environments with spurious echoes of widely varying signatures.

The features and advantages described in the specification are not all inclusive, and particularly, many additional features and advantages will be apparent to one of ordinary skill in the art in view of the drawings, specification and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

DETAILED DESCRIPTION OF THE PREFERRED EMBODIMENT

FIGS. 1 through 4 of the drawings depict various preferred embodiments of the present invention for purposes of illustration only. One skilled in the art will readily recognize from the following discussion that alternative embodiments of the structures and methods illustrated herein may be employed without departing from the principles of the invention described herein.

The preferred embodiment of the present invention is an ultrasonic range sensing and position control device having a capability for detecting spurious echoes and avoiding positioning errors due to such spurious echoes.

The detection or measurement of distance using ultrasonic methods utilize the time of flight of an acoustic wavefront between the ranging device and the datum or target of interest. The measured distance between the ultrasonic transmitter and the datum is a function of the elapsed time between transmission of a ranging burst and reception of an echo from the datum. The distance is equal to one half of the round-trip elapsed time multiplied by the speed of sound. Since a direct relationship exists between elapsed time and distance, time and distance are often used interchangeably in ultrasonic ranging devices. It is understood that the concepts of measured time of flight of an ultrasonic wave between the ultrasonic ranging device and the datum, and the corresponding distance therebetween may be used interchangeably in this application.

The ultrasonic ranging device of the present invention repeatedly detects or measures distance between the device and a datum according to the measured elapsed time between transmission of a ranging burst and detection of an echo. The device repeatedly executes a "ranging interval" to determine time of flight. The phrase "ranging interval" as used throughout this disclosure refers to the time period beginning with the transmission of an ultrasonic ranging pulse and including the time period during which an echo may be detected. If an echo is detected within the ranging interval, then the elapsed time between the transmission of the ranging pulse and the time of echo detection is a measurement of distance between the device and a datum. If no echo is detected within the time period of the ranging interval, then no measurement of distance is made.

Figure 1A:
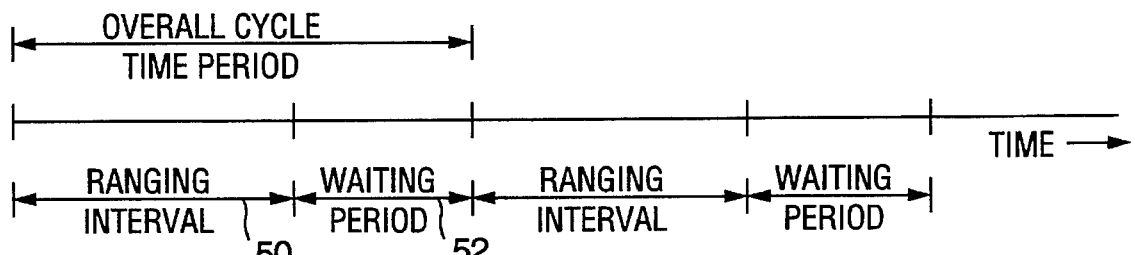
FIGS. 1a-1e are simplified timing diagrams illustrating the operation of a device according to the present invention.
Figure 1B:
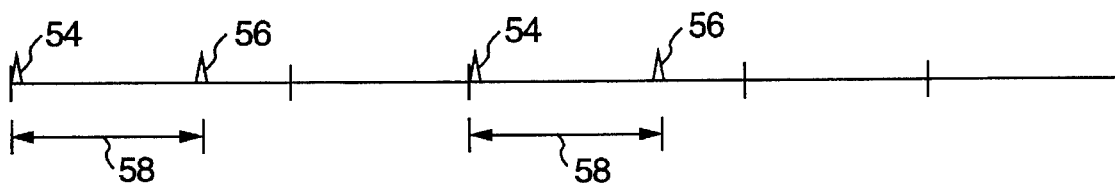

The present invention repeats the ranging intervals at a predetermined repetition rate. As illustrated in FIGS. 1(a) and 1(b), the overall cycle time period between successive ranging intervals is longer in duration than a single ranging interval 50. A variable "waiting period" 52 occurs between successive ranging intervals. Each ranging interval begins with the transmission of a ranging pulse 54, as shown in FIG. 1(b), and an echo 56 from the datum may be detected within the ranging interval. There is no detection of an echo during the waiting period since the detection circuitry is disabled during that time. As explained below, the present invention adjusts the duration of the waiting period in order to shift spurious echoes out of the ranging intervals. This adjustment to the waiting period adjusts the overall cycle time and also the repetition rate. It is understood that the overall cycle time period and the corresponding repetition rate between ranging intervals are simply reciprocals of each other.

The ultrasonic ranging device of the present invention assumes that the first echo detected following the transmission of a ranging pulse is an echo from the datum. If this first echo is an echo from a previous transmission and not an echo from the datum of the most recent transmission, then the sensor will erroneously report this echo as determinative of the actual distance. Such an echo is a spurious echo because it is not the first echo from the datum of the most recent ranging burst. A spurious echo can arise, for example, as a result of multiple reflections from flat surfaces above and below the ranging device or from angled surfaces adjacent to the ranging device.

According to the present invention, the ultrasonic ranging device determines whether a spurious echo is present. It does so by occasionally executing a "silent interval" which enables the detection of an echo but without first transmitting a ranging pulse. If any echo is detected during this silent interval, it is identified as a spurious echo from a previous ranging interval. The phrase "silent interval" as used throughout this disclosure refers to the time period during which no ultrasonic pulse is transmitted and including the time period during which the presence of an echo is detected. The silent interval is equal in duration to a ranging interval, but no ranging pulse is transmitted.

When a spurious echo is detected, a ranging adjustment procedure (explained below) is triggered that increases the waiting period between successive ranging intervals by a predetermined incremental amount. The ultrasonic ranging device will then conduct ranging intervals with this new period for several ranging cycles before a silent interval is again executed. If during this subsequent silent interval a spurious echo is detected, the waiting period is again increased by the same incremental amount. This process will continue until the offending spurious echo occurs before the next ranging interval, which cures the false detection problem. If the physical geometry changes and again introduces a spurious echo into the ranging interval, a silent interval will detect the spurious echo and the waiting period will again be increased by small intervals.

FIGS. 1(a) through 1(e) are simplified timing diagrams showing how the ultrasonic ranging device of the present invention operates to detect and remove spurious echoes. FIG. 1(a) simply identifies two successive ranging intervals 50 with intermediate waiting periods 52. As shown in FIG. 1(b), each ranging interval begins with the transmission of a ranging pulse 54 and follows with the detection of an echo 56 from the datum. After the waiting period 52 and during the next ranging interval 50, the device again transmits a ranging pulse 54 and detects an echo 56 from the datum. In each ranging interval, the measured distance between the device and the datum is a function of the time 58 between the transmission of the ranging pulse and the detection of the datum echo. In FIG. 1(b), no spurious echoes are present.

Figure 1C:
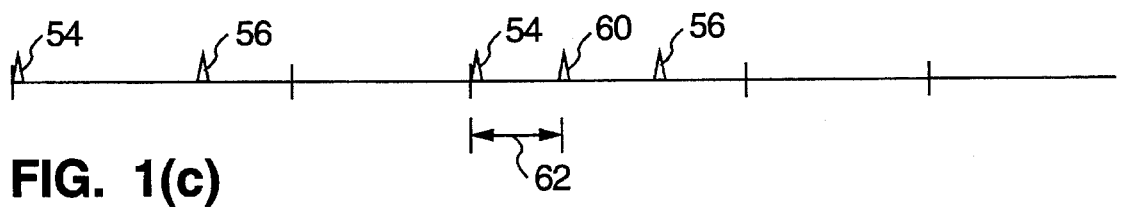

In FIG. 1(c), a spurious echo 60 is present during the second ranging interval. Since the spurious echo 60 is detected before the datum echo 56, the device would indicate the time 62 as the measured distance, but this would be an error caused by the spurious echo.

Figure 1D:
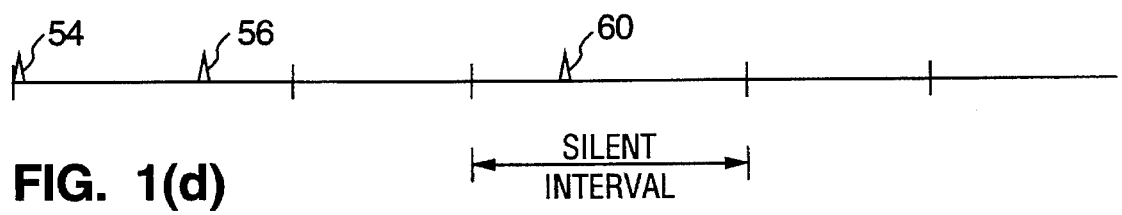

Detection of the spurious echo by executing a silent interval is illustrated in FIG. 1(d). The spurious echo 60 is an echo from the prior transmission of a ranging pulse 54. In the silent interval 64, there is no transmission of a ranging pulse, and consequently no echo from the datum. Thus, any echo detected during the silent interval is a spurious echo 60.

Figure 1E:
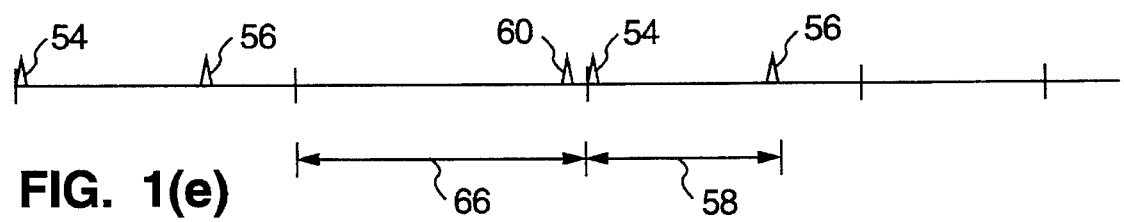

When a spurious echo is detected, the overall cycle time period is increased by increasing the duration of the waiting period until the spurious echo no longer occurs during a ranging interval. As illustrated in FIG. 1(e), an increased waiting period 66 delays the beginning of the ranging interval so that the spurious echo 60 does not interfere with the detection of the true echo 56 from the datum. Since the spurious echo is not detected in the ranging interval, a true measurement 58 of the distance between the device and datum is obtained.

In the preferred embodiment, the overall cycle time period between the beginning of one ranging interval and the beginning of a subsequent ranging interval preferably varies between 25 msec and about 50 msec in 2 msec (about 1 foot) steps. This overall cycle time period includes both the ranging interval and the subsequent waiting period. At a cycle time of 25 msec, the repetition rate is 40 intervals per second and, if spurious echoes are detected, the repetition rate is incrementally decreased to a minimum rate of about 20 intervals per second (about 50 msec per interval). Once at a minimum rate (maximum overall cycle time), if another spurious echo is detected then the repetition rate is reset at the maximum 40 intervals per second (cycle time of 25 msec).

Figure 2:
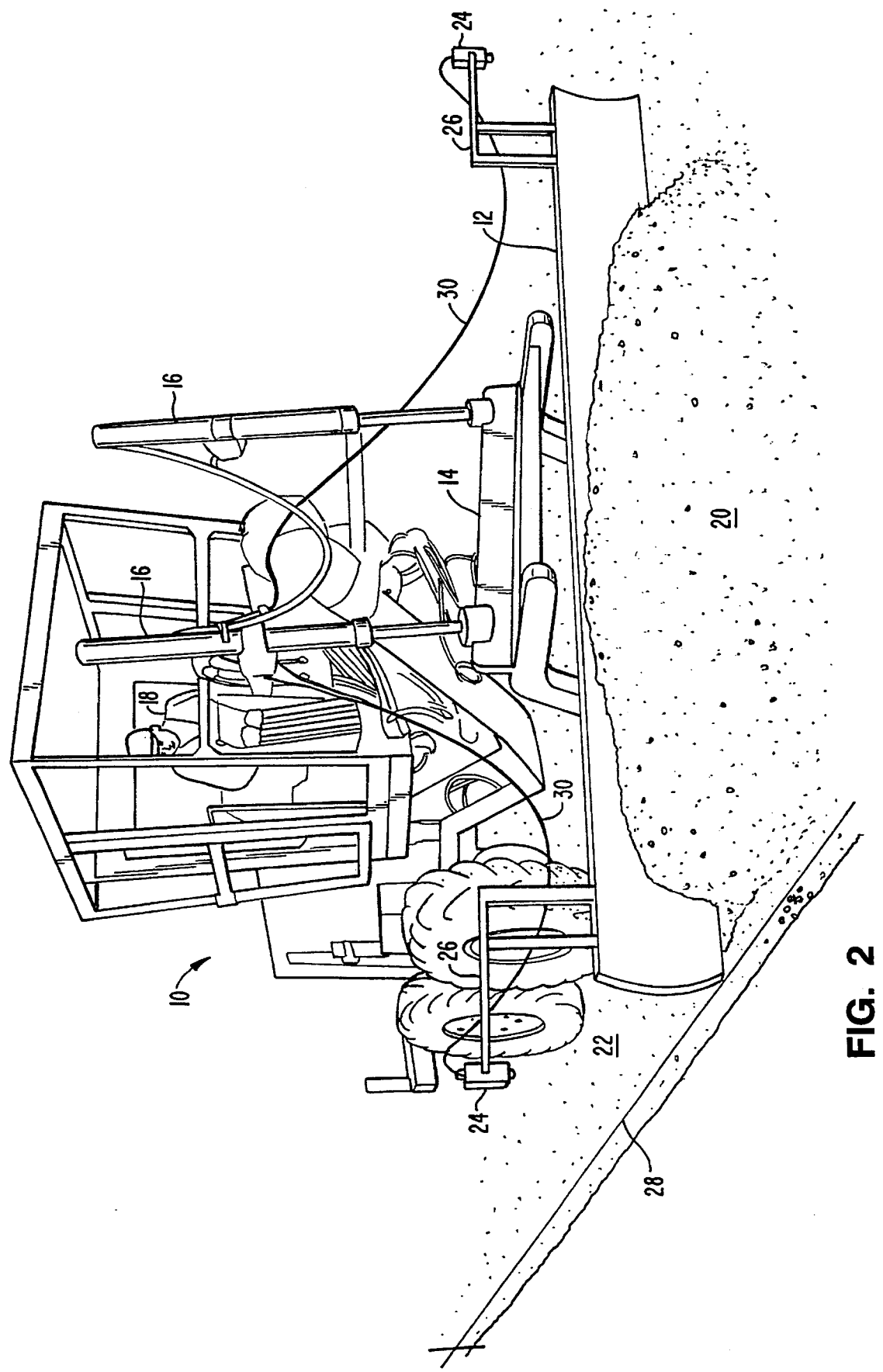
FIG. 2 is a diagram showing an ultrasonic ranging device, embodying the present invention, as used in operation on a motor grader.

A preferred embodiment of the invention carrying out the features set forth above will now be described in connection with FIGS. 2–4. FIG. 2 generally shows an embodiment of the device of the present invention in operation. A motor grader 10 is illustrated in FIG. 2 with the front portion of the motor grader removed for clarity. Slung underneath the motor grader 10 is a blade 12, which is mounted on a platform 14 that is pivotally attached to the front of the motor grader (not shown). The vertical position of the platform 14 and the blade 12 is adjusted by two hydraulic cylinders 16. The slope of the blade 12 with respect to horizontal can be varied by independent movement of the cylinders 16. Additional hydraulic systems (not shown) are operable for rotating the blade 12 around a vertical axis, varying the angle of attack of the blade, and moving the blade laterally. Forward motion of the motor grader 10 evenly spreads a pile of dirt or gravel 20 into a graded surface 22.

Two ultrasonic ranging devices 24 of the present invention are shown mounted on frames 26 to both sides of the blade 12. Both ranging devices 24 overhang the outer edges of the blade 12 and are positioned above a datum, such as a string line 28, that is located just outside of the width of the blade and that extends along the direction of travel of the motor grader 10. Each ranging device is connected via an electrical cable 30 to a control box (not shown) located near the operator 18 in the operator's cab. Either of the two ranging devices 24 can be used to sense a datum 28 for controlling the vertical position of the blade 12. Alternatively, the ranging devices 24 could sense two separate datums, one on each side of the motor grader 10, for controlling both the vertical position and the slope of the blade 12.

Figure 3:
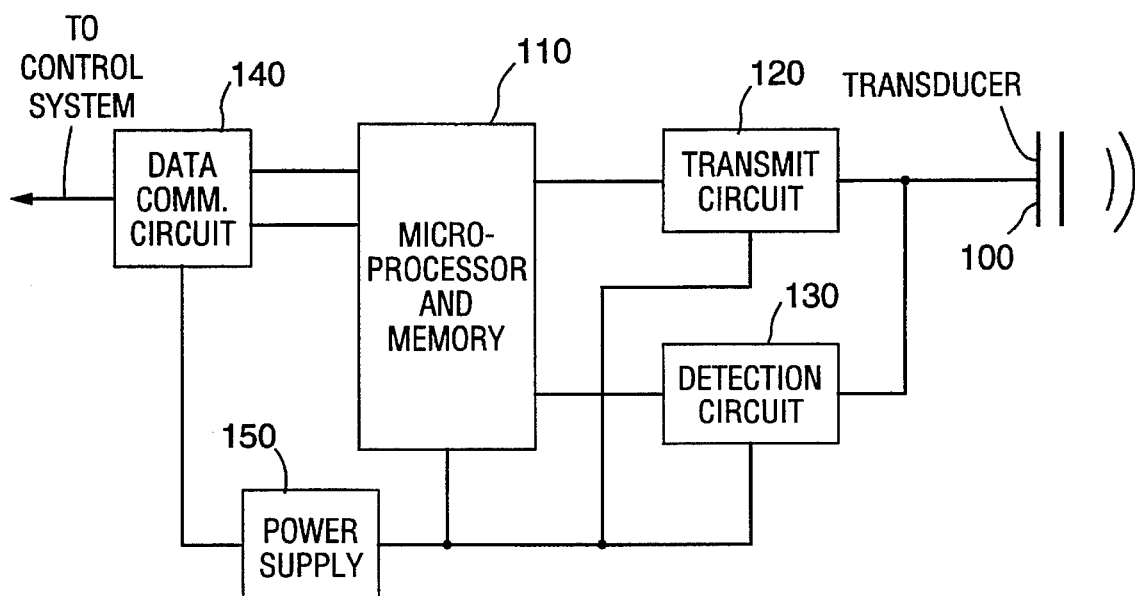
FIG. 3 is a hardware diagram of a preferred embodiment of the present invention.
Figure 4:
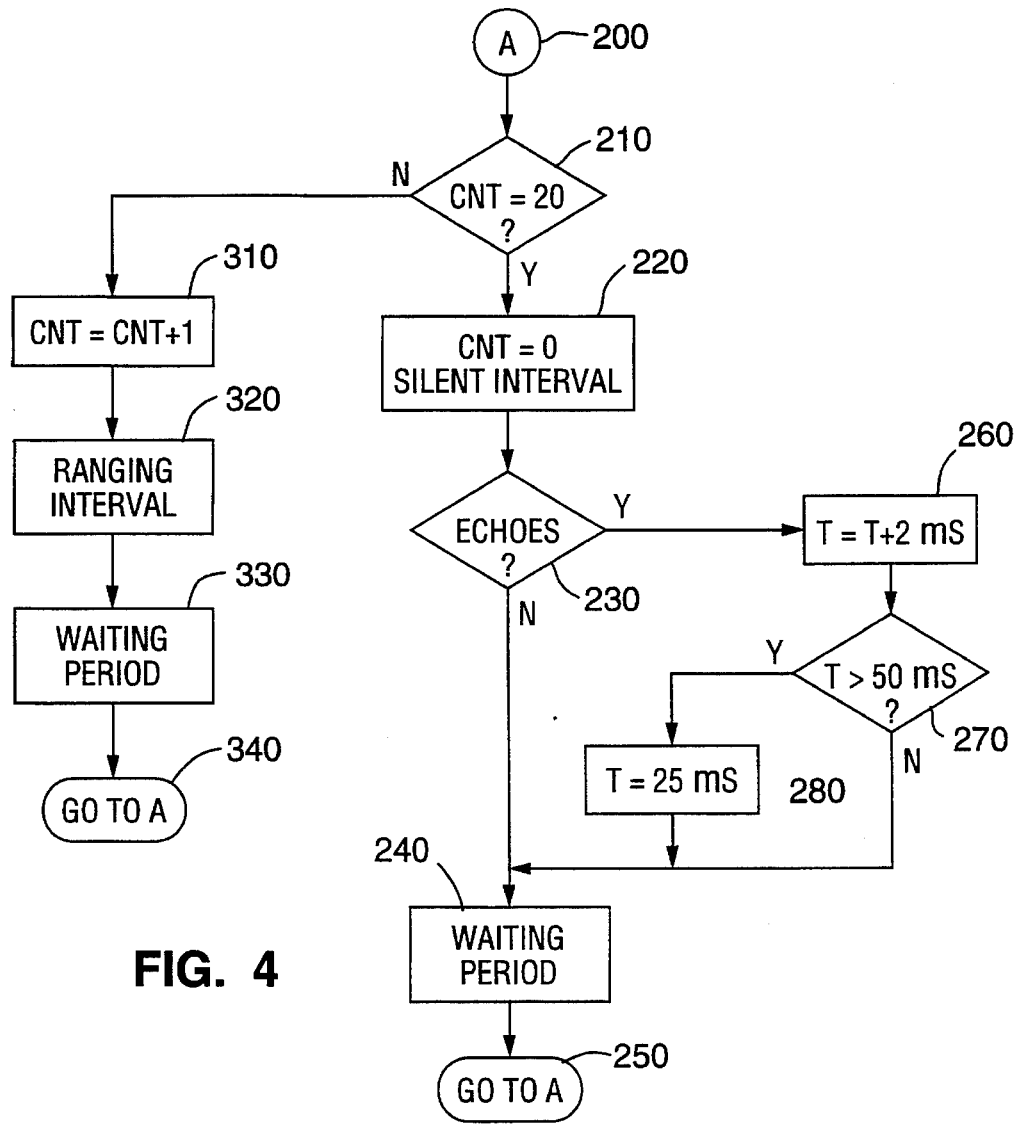
FIG. 4 is a software flowchart showing certain steps programmed into the hardware of FIG. 3.

The hardware configuration of the present invention is shown in a simplified block diagram in FIG. 3. Ultrasonic transducer 100 sends ultrasonic signal pulses toward a datum (not shown) such as a road surface or string line and receives echoes reflected therefrom. A microprocessor unit 110, including a memory, is coupled to a data communication circuit 140, a transmission circuit 120 and a detection circuit 130. A power supply, generally shown as block 150, supplies power to the hardware components.

The execution of a ranging interval will now be discussed in connection with the hardware of FIG. 3. The ranging interval, as mentioned above, refers to the time from transmission of a pulse through and including the time during which an echo may be detected. In response to control signals from microprocessor 110, transmission circuit 120 signals transducer 100 to transmit an ultrasonic pulse consisting of a small number of cycles of at an ultrasonic frequency. Subsequently, microprocessor 110 switches from a transmission mode to a detection mode and controls the reception and detection circuit 130 to detect any echo received by transducer 100. A brief period of time passes between the transmission of the pulse and the initiation of the detection mode to allow the transducer vibrations to settle. The transducer is maintained in a detection mode for a predetermined period of time, ending at the end of the ranging interval. Then a waiting mode is entered, during which time the transducer 100 is idle for a period of time referred to as the waiting period. The waiting period is selected such that the cycle time period between ranging pulses is preferably between 25 msec and 50 msec. After the waiting period, another ranging interval is executed, beginning with the microprocessor 110 again causing the transmission circuit 120 to issue a signal to the transducer 100 to transmit another ranging pulse.

Microprocessor 110 analyzes the time that passes between the transmission of an ultrasonic pulse and the reception of an echo to determine the distance between the device and another object, such as a road surface. The microprocessor then determines whether an adjustment to the implement position is needed and, if so, communicates to a control system through the data communication circuit 140. On the basis of this determination, the grading implement is adjusted as necessary to achieve a desired position. By doing this, a goal such as paving a road surface at a particular grade can be accomplished. This method of constantly measuring and adjusting allows smooth and efficient operation of the grading implement with little effort by the operator of the grading vehicle.

The method of adjusting the period of time between transmitted pulses will now be described in connection with the flow chart of FIG. 4, beginning at block "A" on the flow chart, which is labelled as step 200. The next step 210 in the flow chart is a decision block where it is determined if a particular count is equal to 20. This counter controls how many ranging intervals are executed between silent intervals. It is to be understood that although a count of 20 is used in describing the flow chart of this invention, the value of this number as well as other numbers used herein can be chosen to accommodate the needs of each particular application of the present invention. At Step 210, the number of pulse transmissions that have passed since the previous silent interval is counted. If the number is less than 20 then the program flow branches to a routine that executes a ranging interval and the count is incremented at block 310.

Step 320 calls for a normal ranging interval to occur, including transmitting an ultrasonic pulse and detecting an echo. Step 330 calls for a waiting period as previously determined by the microprocessor. This waiting period defines the period of time between the end of the previous ranging interval and the beginning of the next ranging interval. As stated above, the duration of the ranging interval and the duration of the waiting period equals the overall cycle time period between ranging pulses. During the waiting period, a control step may be executed for determining any positional error of the implement and adjusting accordingly. At the conclusion of the waiting period as indicated by step 340, the program flow returns to point "A", step 200.

At step 210, if the count is equal to 20, then the count is reset to zero and program flow branches to a subroutine that generates a silent interval. During the silent interval at step 220, unlike the ranging interval 320, no ranging pulse and no control signals to raise or lower the implement are generated. Instead, only the detection circuit 130 is operated. The program control then branches at step 230 depending on whether an echo is detected during the silent interval. Here it is determined whether any spurious echoes have been detected. If no echo was detected, then the cycle time period between ranging pulses remains unchanged. In that case, a waiting period at step 240 is executed for the remainder of the overall cycle time period and, at the end of the waiting period, according to step 250, the subroutine is returned to step 200.

If an echo was detected during the silent interval, then the cycle time period is changed. If any spurious echoes are detected during the silent interval, program flow branches to step 260 where the cycle time period is increased by a predetermined amount such as 2 msec (T= T+2 msec, where T is the time interval between pulses). This is accomplished by increasing the length of the waiting period by 2 msec. At step 270, it is determined whether the cycle time period has exceeded a preset maximum, stored in memory, such as 50 msec. If not, then the new time interval is stored in memory and used during the next series of ranging intervals. If the preset maximum has been exceeded, then according to step 280 the cycle time period is reset to a predetermined minimum such as 25 msec.

From the above description, it will be apparent that the invention disclosed herein provides a novel and advantageous apparatus for ultrasonic ranging measurements. The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

What is claimed is:

1. A method for distinguishing spurious ultrasonic ranging echoes arising during ultrasonic distance measurement, wherein the method comprises the steps of:

providing an ultrasonic device including means for transmitting an ultrasonic pulse toward a datum and means for detecting the occurrence of an echo of the transmitted ultrasonic pulse;

periodically transmitting an ultrasonic pulse toward the datum and then detecting the occurrence of any echo within a time interval, wherein this step is repeated at a predetermined repetition rate;

detecting the occurrence of an echo within the time interval without having transmitted an ultrasonic pulse, and if an echo is so detected then changing the predetermined repetition rate.

2. A method for distinguishing spurious ultrasonic ranging echoes arising during ultrasonic distance measurement, wherein the method comprises the steps of:

performing a plurality of ranging intervals at a repetition rate, wherein each ranging interval includes a step of transmitting an ultrasonic pulse toward a datum and then a step of detecting the occurrence of any echo during the ranging interval;

performing a silent interval which includes a step of detecting the occurrence of any echo during the silent interval but does not include the step of transmitting an ultrasonic pulse; and changing the repetition rate of ranging intervals if an echo is detected during the silent interval.

3. A method as recited in claim 2 wherein said steps of performing a plurality of ranging intervals, performing a silent interval, and changing the repetition rate are continually repeated.

4. A method as recited in claim 3 wherein the silent interval is performed after a predetermined number of ranging intervals and the repetition rate for the next plurality of ranging intervals is determined by whether an echo is detected during the silent interval.

5. A method as recited in claim 2, wherein the steps of transmitting and detecting are accomplished with the use of an ultrasonic transducer.

6. A method as recited in claim 5, wherein during the step of performing a plurality of ranging intervals, a delay time exists between the step of transmitting and the step of detecting to allow the transducer to settle.

7. A method as recited in claim 2, wherein the step of changing the repetition rate of ranging intervals is executed by increasing a period between ranging intervals until no echo is detected during a silent interval.

8. A method as recited in claim 7, wherein the period between ranging intervals is increased up to a maximum value if echoes are detected during silent intervals and is thereafter reset to a minimum value.

9. A method as recited in claim 8 wherein the repetition rate varies between 20 repetitions per second and 40 repetitions per second.

10. A method as recited in claim 2 wherein the period between ranging intervals varies between 25 milliseconds and 50 milliseconds.

11. An ultrasonic ranging device for determining the distance between the device and a datum, said device comprising:

an ultrasonic transducer;

a transmitter circuit coupled to the ultrasonic transducer and including means for periodically transmitting an ultrasonic ranging pulse;

a receiver circuit coupled to an ultrasonic transducer and including means responsive to received ultrasonic energy for detecting the presence of an echo of a previously transmitted ultrasonic ranging pulse; and a processor coupled to the transmitter and receiver circuits, wherein the processor includes means for determining a time measure of the distance between the device and the datum by transmitting an ultrasonic pulse toward the datum and then detecting the occurrence of an echo from the datum;

wherein the processor further includes means for detecting a spurious echo by detecting the occurrence of a delayed echo from a prior transmission of an ultrasonic ranging pulse;

and wherein the processor further includes means responsive to the detection of any spurious echoes for choosing between multiple echoes to determine the echo from the datum.

12. An ultrasonic ranging device for determining the distance between the device and a datum, said device comprising:

an ultrasonic transducer;

a transmitter circuit coupled to the ultrasonic transducer and including means for periodically transmitting an ultrasonic ranging pulse;

a receiver circuit coupled to an ultrasonic transducer and including means responsive to received ultrasonic energy for detecting the presence of an echo of a previously transmitted ultrasonic ranging pulse; and a processor coupled to the transmitter and receiver circuits, wherein the processor includes means for performing a series of ranging intervals at a predetermined repetition rate, wherein each ranging interval includes transmitting an ultrasonic pulse toward the datum and then detecting the occurrence of an echo during the ranging interval;

wherein the processor further includes means for detecting a spurious echo by detecting the occurrence of an echo without having transmitted an ultrasonic pulse;

and wherein the processor further includes means for changing the repetition rate of ranging intervals if a spurious echo is detected.

\* \* \* \* \*